(12) United States Patent
Oh

(10) Patent No.: US 6,916,351 B2
(45) Date of Patent: Jul. 12, 2005

(54) CYCLONE-TYPE DUST COLLECTING APPARATUS FOR A VACUUM CLEANER

(75) Inventor: Jang-keun Oh, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 417 days.

(21) Appl. No.: 10/271,884

(22) Filed: Oct. 16, 2002

(65) Prior Publication Data

US 2003/0221278 A1 Dec. 4, 2003

(30) Foreign Application Priority Data

May 31, 2002 (KR) ........................................ 2002-30721

(51) Int. Cl.[7] .............................................. B01D 45/12
(52) U.S. Cl. ............................ 55/304; 55/405; 55/429; 55/459.1; 55/DIG. 3
(58) Field of Search ........................... 55/304, 404, 405, 55/429, 459.1, DIG. 3; 15/352, 353

(56) References Cited

U.S. PATENT DOCUMENTS

| 5,066,315 | A | 11/1991 | Haberl |
| 5,275,634 | A | 1/1994 | Kramer |
| 5,948,127 | A | 9/1999 | Minakawa et al. |
| 6,521,006 | B2 | 2/2003 | Park et al. |
| 6,810,558 | B2 * | 11/2004 | Lee .............................. 15/353 |

FOREIGN PATENT DOCUMENTS

| DE | 1059636 | 6/1959 |
| DE | 10035253 | 8/2001 |
| EP | 0841095 A2 | 5/1998 |
| EP | 0841095 | 5/1998 |
| EP | 0841095 A3 | 4/1999 |
| GB | 2230474 | 10/1990 |
| JP | 8206543 | 8/1996 |
| RU | 413960 | 2/1974 |
| RU | 1001918 | 3/1983 |
| SU | 413960 | 2/1974 |
| SU | 1001918 | 3/1983 |

* cited by examiner

*Primary Examiner*—Robert A. Hopkins
(74) *Attorney, Agent, or Firm*—Ladas & Parry LLP

(57) ABSTRACT

The cyclone-type dust-collecting apparatus for a vacuum cleaner according to the disclosed invention has a grill cleaning means for automatically removing fine dusts covering the grill when the cleaner is in use. The grill cleaning means preferably comprises a grill rotating means for rotating the grill while the cleaner is in use and a dusting member disposed to extend along one side of the inner cyclone body to contact the outer circumference of the rotating grill. The grill rotating means comprises a rotation member disposed at top of the cyclone body to rotatably support the grill in relation to the cyclone body and to rotate together with the grill, connected with the grill by a number of connection members, and having an upper surface of the cyclone body excluding the air discharge port positioned in between, and provided with a gear portion formed around the outer circumference, a driving source for providing driving force for rotating the rotation member, and a power transferring means for transferring power of the driving source to the rotation member. The driving source may comprise a turbine fan disposed in the discharge pipe of the air discharge unit to be rotated by air discharged through the discharge pipe.

10 Claims, 7 Drawing Sheets

PRIOR ART

CYCLONE-TYPE DUST COLLECTING APPARATUS FOR A VACUUM CLEANER

BACKGROUND OF THE INVENTION

1. Field of the Invention

The present invention relates generally to a vacuum cleaner, and more particularly, to a cyclone-type dust collecting apparatus for a vacuum cleaner for separating and collecting dust and dirt from a cyclone stream by a centrifugal force formed by a cyclone stream in the suction air including dust and dirt flown in through the suction port of the vacuum cleaner.

2. Description of the Related Art

An example of the above described cyclone-type dust collecting apparatus and a vacuum cleaner having the same is shown in FIGS. 1 and 2 and described hereinafter.

In FIG. 1, the reference number 100 identifies a cyclone-type dust collecting apparatus, 200 is a cleaner body, and 300 is a suction brush. The reference number 10 is a cyclone body, 20 is a dirt-collecting receptacle, and 30 is a grill, elements 10, 20, 30 together comprising the cyclone-type dust collecting apparatus 100.

As shown in FIG. 1 and FIG. 2, the cyclone body 10 has an air inlet pipe 11 and an air discharge unit 12. The air inlet pipe 11 is disposed to be connected with an air inlet port provided on one side of the cyclone body 10 and connected to an air inlet path 210 (shown in phantom) formed to be connected to a suction port (not shown) of a suction brush 300 in the cleaner body 200 when the cyclone-type dust-collecting apparatus is mounted in the cleaner body 200. The air discharge unit 12 is disposed to be connected with an air discharge port provided on one side of the upper surface the cyclone body 10 and connected to an air discharge path 220 (shown in phantom) formed to be connected to a motor driving chamber 310 of the suction brush 300 in the cleaner body 200 when the cyclone-type dust-collecting apparatus is mounted in the cleaner body 200. Therefore, the air, including dust and dirt, flows in through the suction brush 300 in a tangential direction within the cyclone body 10 through the air inlet path 210 of the cleaner body 200 and the air inlet pipe 11. Accordingly, a cyclone stream is formed in the cyclone body 10 and the clean air is discharged outside through the air discharge unit 12, the air discharge path 220 of the cleaning body 200 and the motor driving chamber 310.

The dirt-collecting receptacle 20 is removably connected to the lower part of the cyclone body 10 and collects dust and dirt separated from the air by centrifugal force created by the cyclone stream within the cyclone body 10.

The grill 30 is disposed at the beginning of the air discharge unit 12 of the cyclone body 10 and prevents the dust and dirt separated from the cyclone stream from reverse flowing back through the air discharge unit 12. The grill 30 comprises a grill body 31 and a number of paths 32 disposed on the outer circumference of the grill body 31 to be connected with the air discharge unit 12. Such general cyclone-type dust-collecting apparatus has the air inlet pipe 11 and the air discharge unit 12 of the cyclone body 10 disposed in the cleaner body 200, each to be connected with the air inlet path 210 and the air discharge path 220 of the cleaner body 200 as described earlier. When the cleaner is on, the motor of the motor driving chamber 310 is driven and accordingly the suction force is generated in the suction brush 300. By this suction force, air of the surface to be cleaned, including dust and dirt, flows into the cyclone body 10 through the suction brush 300, the air inlet path 210, and the air inlet pipe 11. The flown-in air forms a cyclone stream by being induced to move in an oblique direction along the inner circumference of the cyclone body 10 and accordingly, the dust and dirt included in the air are separated by centrifugal force and are collected in the dirt-collecting receptacle 20. Then, the clean air is discharged outside through the paths 32 of the grill 30, the air discharge unit 12, and the motor driving chamber 310.

The dust flown into the cyclone-type dust-collecting apparatus, together with air, during the work process of the vacuum cleaner having the above mentioned cyclone-type dust-collecting apparatus includes very fine dust particles. Such fine dust particles cannot be separated by the centrifugal force created by the cyclone stream inside cyclone-type dust collecting apparatus because they are too light. Therefore, the fine dust particles block the paths 32 as they are absorbed in the grill 30 when the flown-in air is discharged through the paths 32 of the grill 30. As the paths 32 are blocked by the absorbed dust particles, resistance in air permeability in that area occurs, and insufficient suction corresponding to the output of the vacuum motor is noted as well as a drop in suction efficiency.

In addition, a lot of dust particles remain absorbed in the grill 30 even after the cleaning operation is finished. Therefore, if the grill 30 is not cleaned regularly the dust collects in the paths 32 every time the cleaner is used and the suction efficiency drops significantly. As a result, the gill 30 essentially requires routine maintenance work, such as cleaning, and a considerable amount of time and trouble on the part of the user.

Moreover, as the grill 30 is connected adjacent the beginning of the air discharge unit 12 inside the cyclone body 10, it is not easy to remove it from the cyclone body 10 and, therefore, cleaning the grill becomes difficult. Also, when a user cleans the dusty grill with cloths, the user's hands become dirty due to the dust and, additionally, the dust drops onto the floor while cleaning and thus pollutes the surroundings. In order to thoroughly clean the grill 30, a considerable amount of time and trouble are required and therefore a user finds such a vacuum cleaner undesirable.

SUMMARY OF THE INVENTION

In order to solve the above-described problems, the present invention provides a cyclone-type dust-collecting apparatus for a vacuum cleaner, which renders easy the maintenance work for the grill disposed in the air discharge port of the cyclone body.

Another object of the present invention is to provide a cyclone-type dust-collecting apparatus not requiring separate work for cleaning the grill since the dust covering the grill is automatically cleaned while the cleaner is in use.

A cyclone-type dust-collecting apparatus for a vacuum cleaner according to the present invention for achieving the above-described objects comprises a cyclone body having an air inlet port and an air discharge port and forming a cyclone stream of air, including dust and dirt flown in through the air inlet port, a dirt-collecting receptacle removably connected to the cyclone body for collecting dust and dirt separated from the cyclone stream by centrifugal force created by the cyclone stream inside the cyclone body, a grill disposed at beginning of the air discharge port of the cyclone body for preventing dust and dirt separated from the air from reverse flowing through the air discharge port of the cyclone body and having a number of paths connected to the air discharge port, and a grill cleaning means for automatically removing fine dust covering the grill, which operates when the cleaner is on.

The grill cleaning means comprises a grill rotating means for rotating the grill while the cleaner is in use and a dusting member disposed along one side of the inner cyclone body to contact the outer circumference of the rotating grill.

The grill rotating means comprises a rotation member disposed adjacent the top of the cyclone body to rotatably support the grill in relation to the cyclone body and to rotate together with the grill, being connected to the grill by a number of connection members, and having the upper surface of the cyclone body excluding the air discharge port positioned in between, and provided with a gear portion formed around the outer circumference, a driving source for providing a driving force for rotating the rotation member, and a power transferring means for transferring power of the driving source to the rotation member.

According to one preferred embodiment of the present invention, the cyclone-type dust-collecting apparatus for a vacuum cleaner has an air inlet pipe connected with an air inlet path formed in the cleaner body that is connected with the air inlet port of the cyclone body, and an air discharge unit connected with an air discharge path formed in the cleaner body that is connected with the cyclone body. The air discharge unit has a circular fixing guide portion formed at bottom of a discharge pipe integral with the discharge pipe and fixed on an upper surface of the cyclone body while covering the rotation member.

The driving source comprises a turbine fan disposed in the discharge pipe of the air discharge unit to be rotated by air discharged through the discharge pipe.

The power transferring means comprises a worm gear connected to the turbine fan axis and protruding outside the discharge pipe, a worm wheel disposed on top of the fixing guide portion to engage with the worm gear, and an intermediate gear disposed coaxially with the worm wheel and positioned at bottom of the fixing guide portion to be engaged with the gear portion of the rotation member.

In a second embodiment, the driving source may comprise a motor disposed on top of the fixing guide portion of the air discharge unit and rotating when a cleaner is in use.

The dusting member may comprise a supporting bar and a wiper having a thin rubber rib vertically attached to extend along one side of the supporting bar.

The cyclone-type dust-collecting apparatus for a vacuum cleaner according to the present invention can prevent the paths of the grill from being blocked due to dust covering the grill as the grill rotates, by action of the grill rotating means while the cleaner is in use and the dusting member is disposed to contact the outer circumference of the rotating grill so as to remove the dust off the grill and therefore maintenance of the vacuum cleaner, such as cleaning the grill, becomes easy.

BRIEF DESCRIPTION OF THE DRAWINGS

The aforementioned objects and characteristics of the present invention will be made more apparent by describing a preferred embodiment of the present invention with reference to the accompanying drawings, in which.

DETAILED DESCRIPTION OF THE PREFERRED EMBODIMENT

Figure 1:
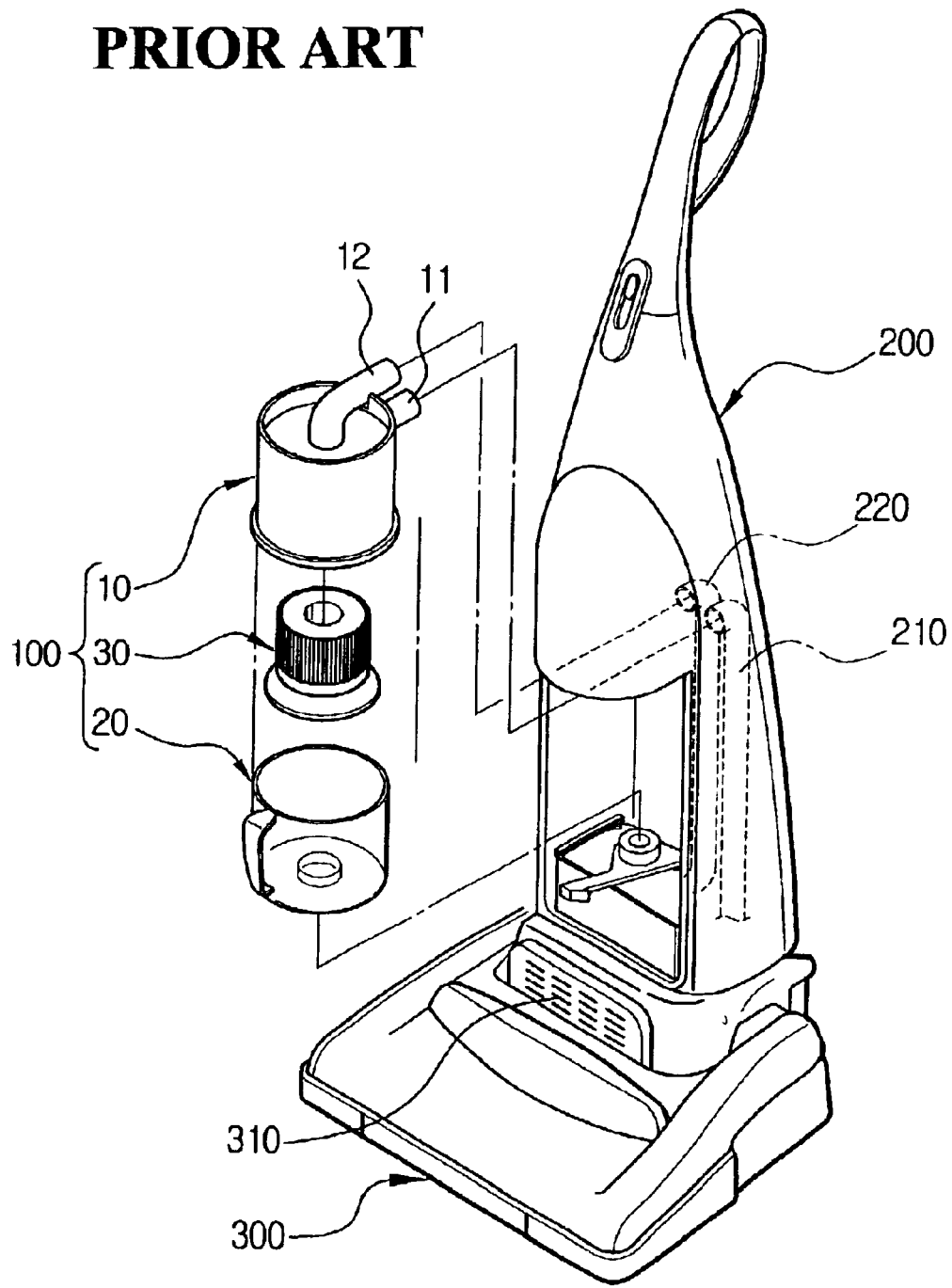
FIG. 1 is an exploded perspective view schematically showing a conventional cyclone-type dust-collecting apparatus for a vacuum cleaner and a vacuum cleaner having the same.
Figure 2:
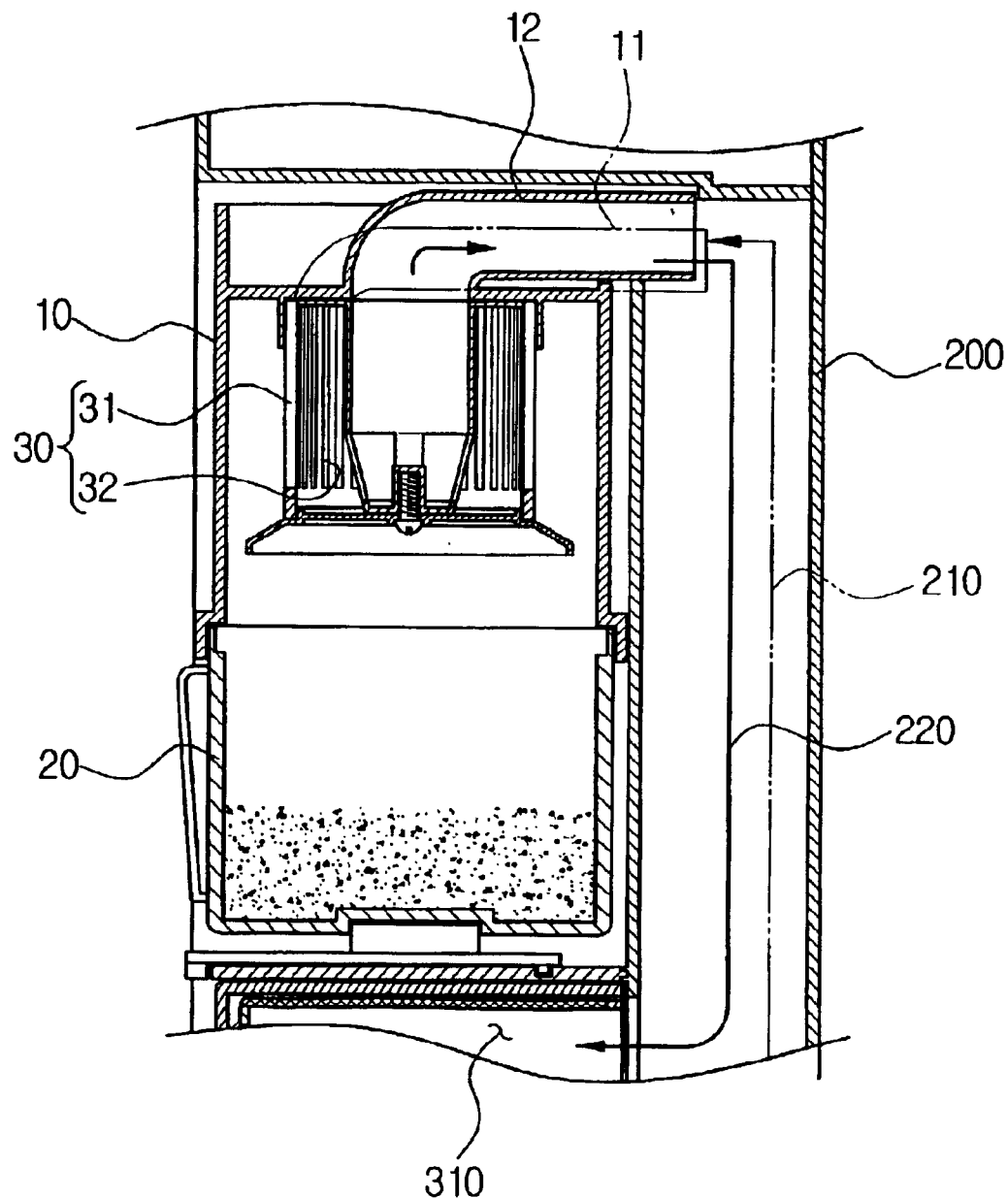
FIG. 2 is a cross-sectional view of the cyclone-type dust collecting apparatus shown in FIG. 1 in an assembled state.

Hereinafter, preferred embodiments of the present invention will be described in greater detail with reference to the accompanying drawings. In describing the embodiments of the present invention, identical reference numbers are given to the parts having the same or similar structure and operation to that of the conventional cyclone-type dust-collecting apparatus for a vacuum cleaner described with reference to FIGS. 1 and 2 above.

Figure 3:
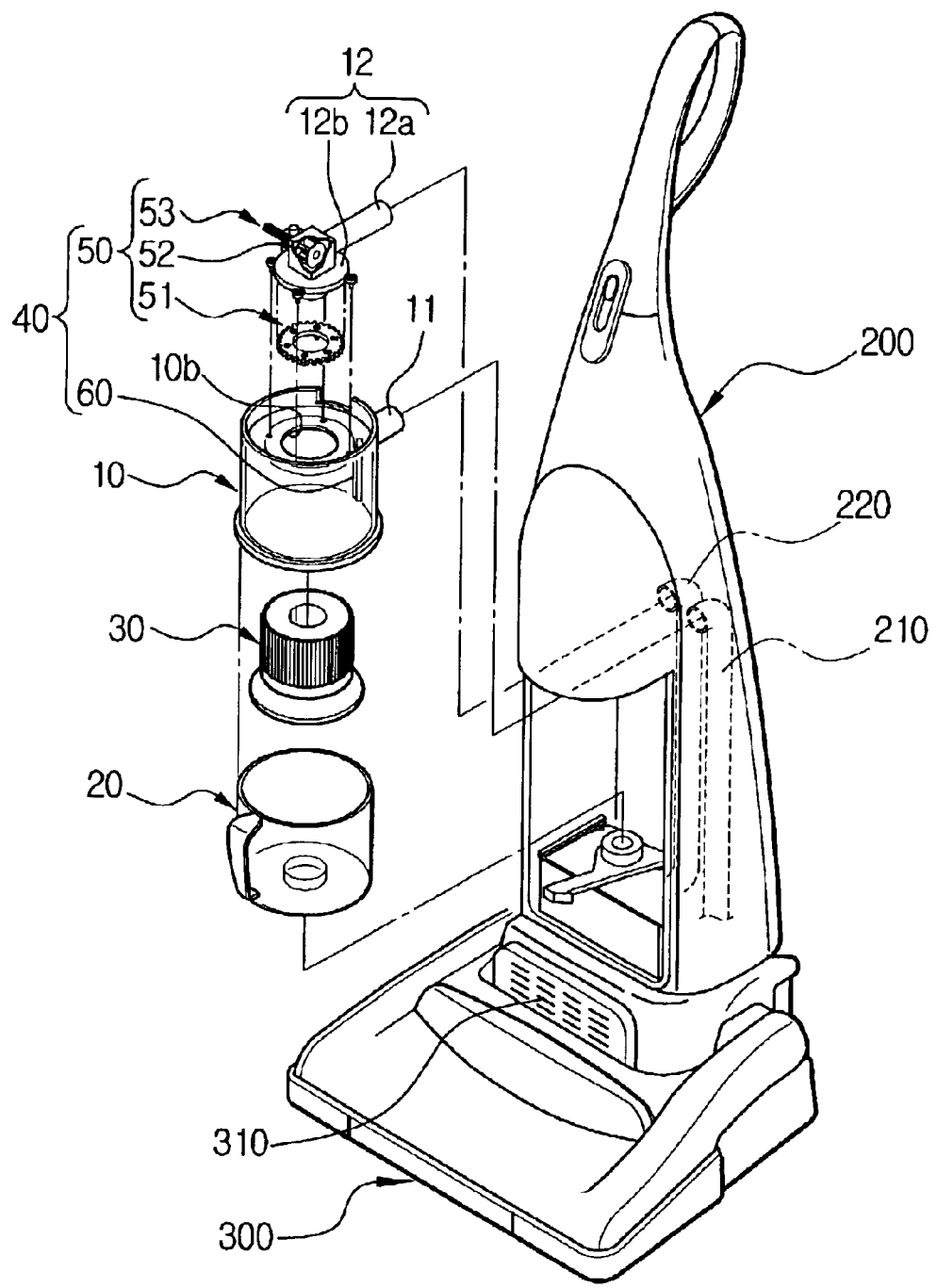
FIG. 3 is an exploded perspective view schematically showing a cyclone-type dust-collecting apparatus for a vacuum cleaner and a vacuum cleaner having the same according to an embodiment of the present invention.
Figure 4:
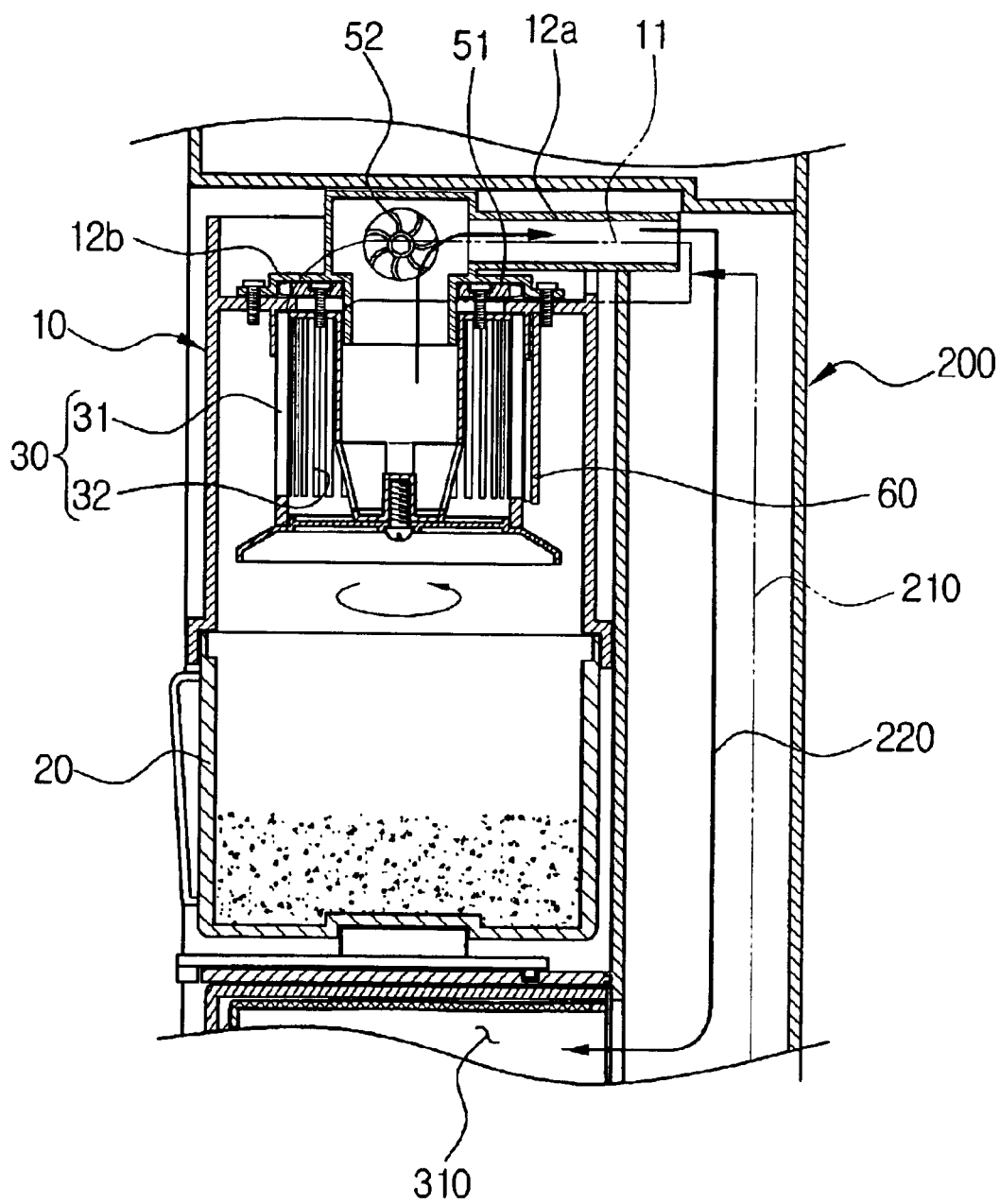
FIG. 4 is a cross-sectional view of a cyclone-type dust-collecting apparatus for a vacuum cleaner in an assembled state of the present invention shown in FIG. 3.

As shown in FIGS. 3 and 4, a cyclone-type dust-collecting apparatus for a vacuum cleaner according to one embodiment of the present invention comprises a cyclone body 10, a dirt-collecting receptacle 20, a grill 30 and a grill cleaning means 40.

The cyclone body 10 has an air inlet pipe 11 and an air discharge unit 12. The air inlet pipe 11 is connected to an air inlet port (not shown) formed at one side of the cyclone body 10 and also is connected with an air inlet path 210 (shown in phantom) formed to be connected to a suction port (not shown) of a suction brush 300 in a cleaner body 200 when the cyclone-type dust-collecting apparatus is mounted in the cleaner body 200. The air discharge unit 12 is connected with an air discharge port 10b formed roughly in the center of the cyclone body's 10 top and has a discharge pipe 12a and a circular fixing guide portion 12b integrally formed adjacent the lower part of the discharge pipe 12a. The air discharge unit 12 is disposed to be connected to the air discharge port 10b of the cyclone body 10 by the fixing guide portion 12b, fixed on the top of the cyclone body 10 by a number of connection members, such as screws. The discharge pipe 12a of the air discharge unit 12 is connected with an air discharge path 220 (shown in phantom) formed in the cleaner body 200 to be connected to a motor driving chamber 310 of the suction brush 300 when the cyclone-type dust-collecting apparatus is mounted in the cleaner body 200.

Therefore, the air, including dust and dirt flown in through the suction brush 300 when the cleaner is in use, flows in at a direction tangential to the cyclone body 10 passing through the air inlet path 210 and the air inlet pipe 11. Accordingly, a cyclone stream is formed in the cyclone body 10, and the dust and dirt included in the cyclone stream is separated from the air by centrifugal force, and the clean air is discharged outside through the air discharge unit 12, the air discharge path 220, and the motor driving chamber 310.

The dirt-collecting receptacle 20 is removably connected to the bottom of the cyclone body 10 for collecting the dust and dirt separated from the air by the cyclone stream in the cyclone body 10. This dirt-collecting receptacle 20 may have a grip disposed for easy handling and can be emptied by separating only the dirt-collecting receptacle 20 when it is full of dust and dirt.

The grill 30 is disposed at the air discharge port 10b inside the cyclone body 10 and prevents the dust and dirt separated from the cyclone stream from reverse flowing through the air discharge port 10b. The grill 30 has a grill body 31 and a number of paths 32 disposed on the outer circumference to be connected through with the air discharge port 10b. The grill 30 is rotatably disposed in the cyclone body 10 according to the characteristics of the present invention. A detailed description in regards to the characteristics will be provided later.

A grill cleaning means 40 automatically removes fine dust off of the grill 30 while operating together with the cleaner when the cleaner is in use and as no dust gets stuck on the outer circumference of the grill 30, the paths 32 do not get blocked and there is no need to continuously clean the grill 30.

The grill cleaning means 40 described above comprises a grill rotating means 50 for rotating the grill 30 when the cleaner is in use, and a dusting member 60 for dusting the grill 30.

Figure 5:
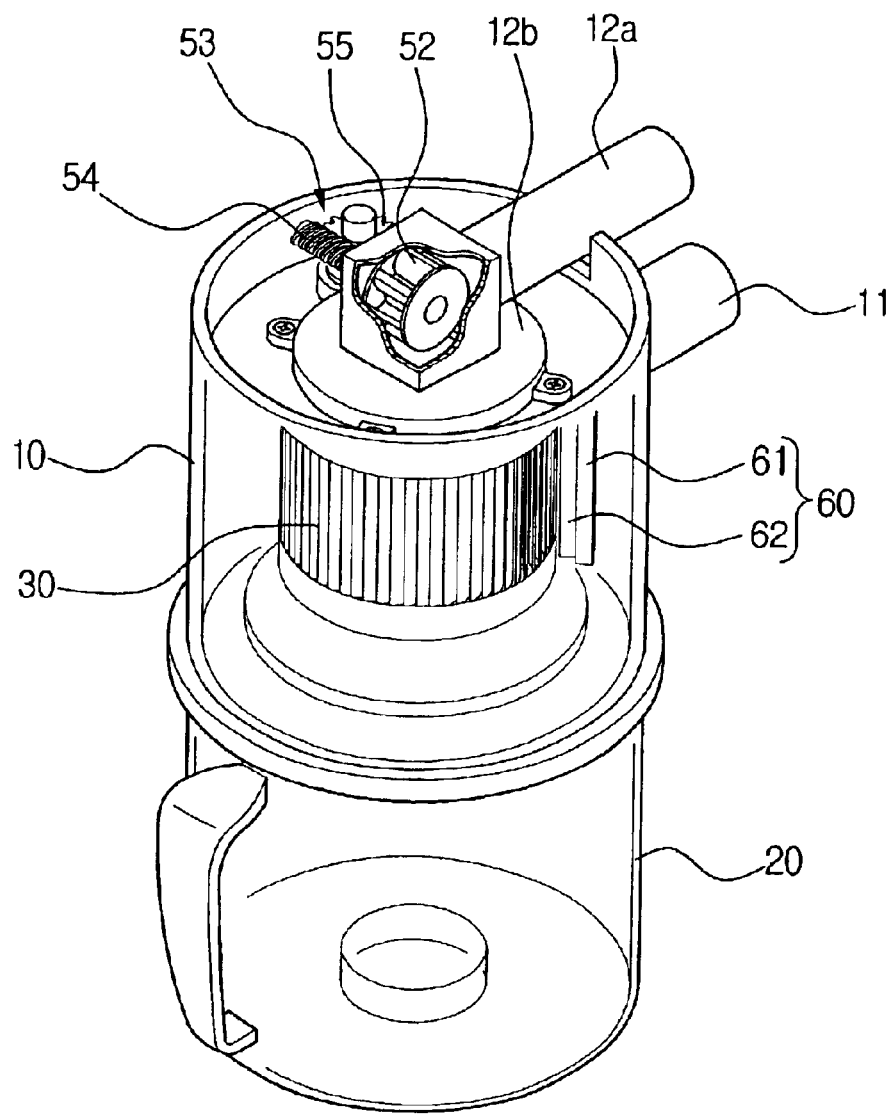
FIG. 5 is a partial cutaway perspective view of a cyclone-type dust-collecting apparatus schematically showing the structure of the inventive grill rotating means.
Figure 6:
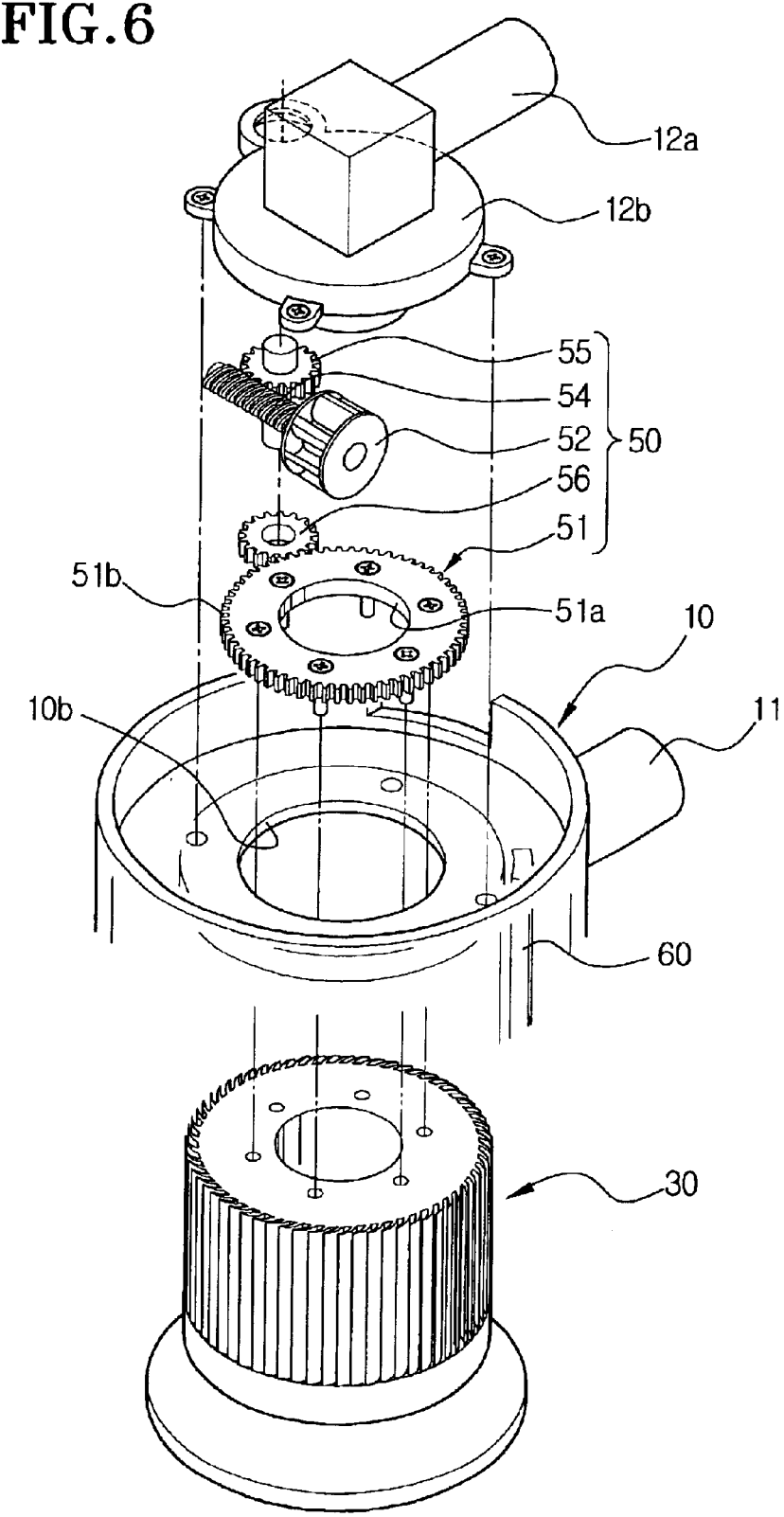
FIG. 6 is an exploded perspective view of the grill rotating means shown in FIG. 5.

The grill rotating means 50, as shown in FIGS. 3, 5 and 6, comprises a rotation member 51 for supporting the grill 30 to be rotatable in relation to the cyclone body 10 and for rotating together with the grill 30, a turbine fan 52 as a driving source, for providing power for rotating the rotation member 51 and a power transferring means 53 for transferring the power of the turbine fan to the rotation member 51.

Referring now to FIG. 6, the rotation member 51 is structured roughly as a circular plate form having a centrally disposed passage hole 51a corresponding to the air discharge port 10b of the cyclone body 10 and a gear portion 51b disposed on the outer circumference. The rotation member 51 is located at the top of the cyclone body 10 and is assembled with the grill 30 located inside the cyclone body 10 by a number of connection members extending through the air discharge port, as shown in FIG. 4. The detailed view of the cyclone body 10, when assembled, is that an upper surface of the cyclone body 10, excluding the air discharge port 10b, is positioned between the rotation member 10b and the top of the grill and the connection members fasten the rotation member 51 to the grill 30 through the air discharge port 10b without passing through the upper surface of the cyclone body 10. Therefore, the grill 30 can be supported while the grill 30 and the rotation member 51 rotate together. The air discharge port 12 is provided at the upper portion of the cyclone body 10 for its circular fixing guide portion to cover the rotation member 51, thus allowing the rotation member to have sufficient space to rotate.

The turbine fan 52 is disposed inside the discharge pipe 12a of the air discharge unit 12 to rotate as a result of the air discharged through the discharge pipe 12a. It is preferable that the discharge pipe 12a is enlarged to permit the turbine fan 52 to be disposed therein but it is not necessary to enlarge the discharge pipe 12a if the size of the turbine fan 52 is reduced.

The power transferring means 53 comprises a worm gear 54 joined with the axis of the turbine fan 52 and protruded outside the discharge pipe 12a, a worm wheel 55 disposed at the upper portion of the fixing guide portion 12b of the air discharge unit 12 to be engaged with the worm gear 54, and an intermediate gear 56 disposed coaxially with the worm wheel and positioned at the lower part of the fixing guide portion 12b of the air discharge unit 12 to be engaged with the gear portion of the rotation member 51. Accordingly, the rotation power of the turbine pan 52 is transferred to the rotation member 51 through the worm gear 54, worm wheel 55 and the intermediate gear 56, and accordingly the grill 30 rotates together with the rotation member 51. The rotation power of the turbine fan 52 rotating at a relatively high speed is reduced by the worm gear 54 and the worm wheel 55 and secondly by the intermediate gear 56 having small diameter and the rotation member 51 having large diameter and therefore the grill 30 may rotate at a low speed.

Meanwhile, the dusting member 60 may comprise a supporting bar 61 extended downward in the length of the grill's height from the inner top of the cyclone body 10, and a wiper having a thin rubber rib 62 vertically attached to along one side of the supporting bar 61 which contacts the outer circumference of the grill 30. However, the structure of the dusting member 60 is not limited to the preferred embodiment and, although not shown, various modified examples for the dusting member, such as a dusting member having a brush vertically attached to along one side of the supporting bar, may be suggested.

Hereinafter, the operation of the cyclone-type dust collecting apparatus for a vacuum cleaner according to a preferred embodiment of the present invention as described above is described.

As described in the description of the related art, the cyclone-type dust collecting apparatus according to the present invention also has the air inlet pipe 11 and air discharge pipe 12 of the cyclone body 10 disposed in the cleaner body 200 respectively to be connected with the air inlet path 210 and the air discharge path 220 of the cleaner body 200.

When the cleaner is on, suction force is generated in the suction brush 300 as the motor of the motor driving chamber 310 is driven and, by the suction force, the air of the to-be-cleaned surface including dusts and dirt is flown into the cyclone body 10 through the suction brush 300, the air inlet path 210, and the air inlet pipe 11. The flown-in air forms a cyclone stream by being induced to move in the oblique direction along the inner circumference of the cyclone body 10 through the air inlet port and accordingly the dusts and dirt included in the air are separated by a centrifugal force and collected in the dirt-collecting receptacle 20. The cleaned air is discharged outside through the paths 32 of the grill 30, the air discharge unit 12, the air discharge path 220 of the cleaner body 200 and the motor driving chamber 310.

The above process of dirt separation and collection is not very different from the conventional art but the grill 30, according to the present invention, rotates during the above process and accordingly the dusting member 60 disposed to contact the outer circumference of the grill 30 continuously and automatically removing the fine dusts off the grill 30.

While the cleaned air passes through the discharge pipe 12a of the air discharge unit 12, the turbine fan 52 disposed in the discharge pipe 12a rotates and the rotation power of the turbine pan 52 is transferred to the rotation member 51 through the worm gear 54, the worm wheel 55 and the intermediate gear 56 and therefore the grill 30, together with the rotation member, rotates. The rotation of the grill 30 continues while the cleaner is on and no fine dust covers the outer circumference of the grill 30, as it does in the conventional art. In other words, blockage of the paths 32 of the grill 30 by the fine dusts covering the grill 30 is reduced and the maintenance of the gill 30, such as cleaning the grill, becomes easy.

Figure 7:
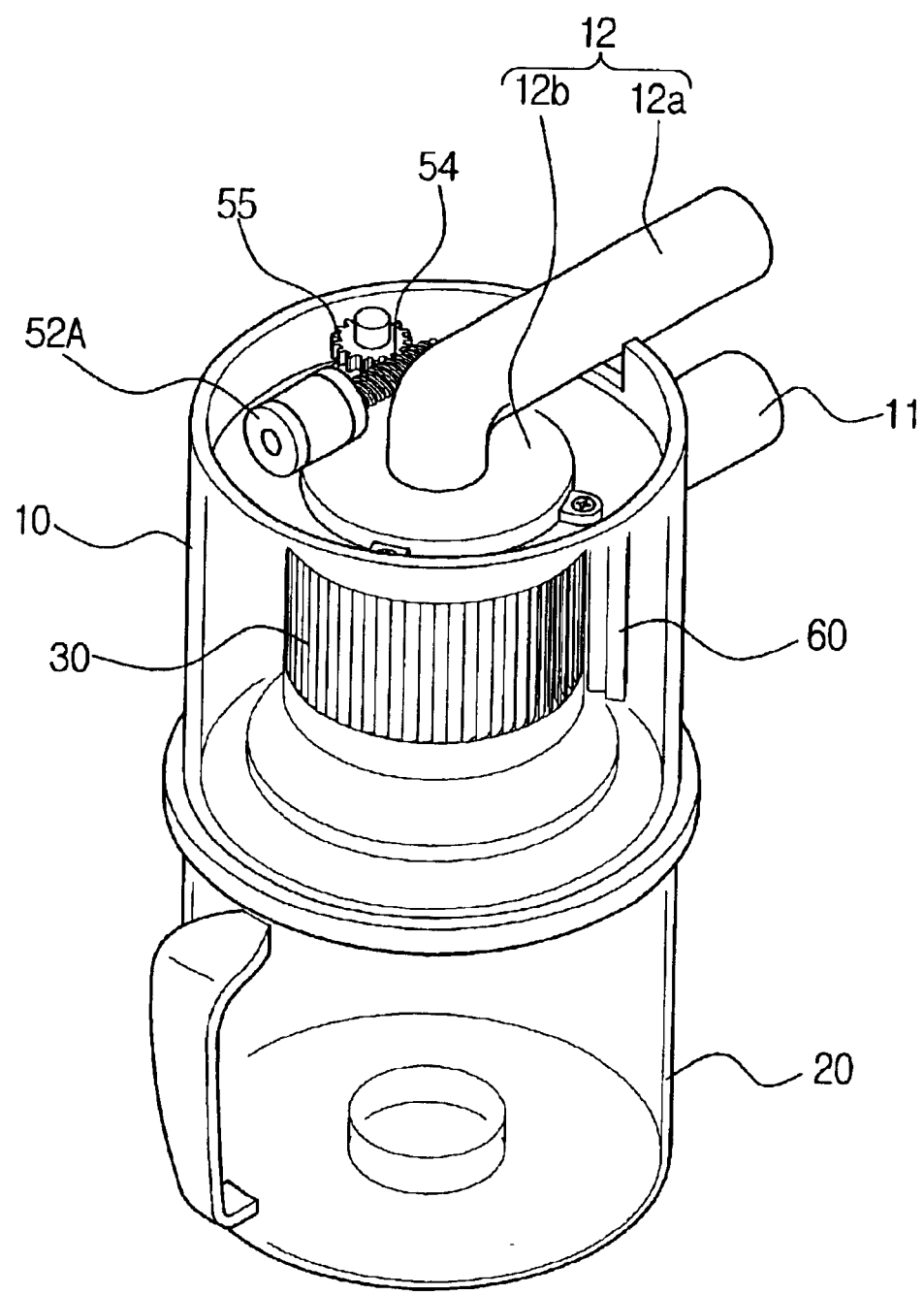
FIG. 7 is a perspective view of a cyclone-type dust-collecting apparatus schematically showing another embodiment of the inventive grill rotating means.

Meanwhile, FIG. 7 illustrates in a perspective view another embodiment of the cyclone-type dust-collecting apparatus schematically showing a second embodiment of the grill rotating means.

As shown, the structure and operation of the grill rotating means 50 of the second embodiment is identical to those of the above description except that the driving source is a motor 52a, driven while the cleaner is on, instead of the turbine fan previously described. Therefore, some details of the structure are not shown in FIG. 7 and the detailed description of the similar elements will be identified by using same reference number.

The motor 52a, as in FIG. 7, is disposed at the upper portion of the fixing guide portion 12b of the air discharge unit 12 and the worm gear 54 comprising the power transferring means 53 previously described is connected to the axis of the motor 52a. The power of the motor 52a is transferred to the rotation member 51 (FIG. 6) through the worm gear 54, the worm wheel 55, and the intermediate gear 56 (FIG. 6) and, accordingly, the grill 30 rotates with the rotation member 51. Here, the motor 52a may use power provided for the cleaner operation for its power source or a small battery.

According to the present invention as described above, fine dust covering the grill 30 can be removed immediately as the dusting member 60 is structured to contact the outer circumference of the rotating grill 30. Therefore, a very satisfying cleaner in the user's point of view can be provided as blockage due to fine dust covering the outer circumference the paths 32 of the grill 30 is avoided and the maintenance of the grill 30, such as cleaning the grill, becomes easy.

Although the preferred embodiments of the present invention have been described, it will be understood by those skilled in the art that the present invention should not be limited to the described preferred embodiments. Various changes and modifications can be made within the sprit and scope of the present invention as defined by the appended claims.

What is claimed is:

1. A cyclone-type dust-collecting apparatus for a vacuum cleaner comprising:
   a cyclone body having an air inlet port and an air discharge port and an inner cyclone body for forming a cyclone stream of air, including dust and dirt, flown in through the air inlet port;
   a dirt-collecting receptacle removably connected to the cyclone body for collecting dust and dirt separated by centrifugal force created by the cyclone stream inside the cyclone body;
   a grill disposed at beginning of the air discharge port of the cyclone body for preventing dust and dirt separated from the air from reverse flowing through the air discharge port of the cyclone body, the grill having a number of paths extending therethrough to communicate with the air discharge port; and
   a grill cleaning means for automatically removing fine dust covering the grill, the grill cleaning means operating when the cleaner is on.

2. The cyclone-type dust-collecting apparatus for a vacuum cleaner as in claim 1, wherein the grill cleaning means comprises a grill rotating means for rotating the grill while the cleaner is in use and a dusting member disposed at one side of the inner cyclone body to contact an outer circumference of the rotating grill.

3. The cyclone-type dust-collecting apparatus for a vacuum cleaner as in claim 2, wherein the grill rotating means comprises:
   a rotation member disposed at top of the cyclone body to rotatably support the grill in relation to the cyclone body and to rotate together with the grill, being connected with the grill by a number of connection members, and having an upper surface of the cyclone body excluding the air discharge port positioned in between, and provided with a gear portion formed around the outer circumference;
   a driving source for providing a driving force for rotating the rotation member; and
   a power transferring means for transferring the power of the driving source to the rotation member.

4. The cyclone-type dust collecting apparatus for a vacuum cleaner as in claim 3, wherein an air inlet pipe is connected with an air inlet path formed in the cleaner body and is connected with the air inlet port of the cyclone body, an air discharge unit connected with an air discharge path formed in the cleaner body is connected with the cyclone body, and the air discharge unit has a circular fixing guide portion formed at a bottom of a discharge pipe being integral with the discharge pipe and fixed on an upper surface of the cyclone body while covering the rotation member.

5. The cyclone-type dust-collecting apparatus for a vacuum cleaner as in claim 4, wherein the driving source comprises a turbine fan disposed in the discharge pipe of the air discharge unit to be rotated by air discharged through the discharge pipe.

6. The cyclone-type dust collecting apparatus for a vacuum cleaner as in claim 5, wherein the power transferring means comprises:
   a worm gear connected to the turbine fan axis and protruding outside the discharge pipe;
   a worm wheel disposed on top of the fixing guide portion to engage with the worm gear;
   an intermediate gear disposed coaxially with the worm wheel and positioned at bottom of the fixing guide portion to be engaged with the gear portion of the rotation member.

7. The cyclone-type dust-collecting apparatus for a vacuum cleaner as in claim 4, wherein the driving source comprises a motor disposed on top of the fixing guide portion of the air discharge unit and rotating when the cleaner is in use.

8. The cyclone-type dust collecting apparatus for a vacuum cleaner as in claim 7, wherein the power transferring means comprises a worm gear connected to an axis of the motor, a worm wheel disposed at upper part of the fixing guide portion to be engaged with the worm gear, and an intermediate gear coaxially disposed with the worm wheel and positioned at lower part of the fixing guide portion to be engaged with gear portion of the rotation member.

9. The cyclone-type dust-collecting apparatus for a vacuum cleaner as in claim 2, wherein the dusting member comprises a supporting bar and a wiper having a thin rubber rib vertically attached to extend along one side of the supporting bar.

10. The cyclone-type dust-collecting apparatus for a vacuum cleaner as in claim 2, wherein the dusting member comprises a supporting bar and a brush vertically attached to extend along one side of the supporting bar.

* * * * *